(12) United States Patent
Ishidoshiro (10) Patent No.: US 7,574,198 B2
(45) Date of Patent: Aug. 11, 2009

(54) SECURITY SETTING SYSTEM

(75) Inventor: Takashi Ishidoshiro, Nagoya (JP)

(73) Assignee: Buffalo Inc., Nagoya-shi, Aichi-ken (JP)

( * ) Notice: Subject to any disclaimer, the term of this patent is extended or adjusted under 35 U.S.C. 154(b) by 0 days.

(21) Appl. No.: 11/198,491

(22) Filed: Aug. 5, 2005

(65) Prior Publication Data
US 2006/0294379 A1    Dec. 28, 2006

(30) Foreign Application Priority Data
Jun. 28, 2005 (JP) .............................. 2005-189061

(51) Int. Cl.
*H04M 1/66* (2006.01)
*H04K 1/00* (2006.01)
*G06F 7/04* (2006.01)

(52) U.S. Cl. ................ 455/410; 455/411; 380/247; 726/2

(58) Field of Classification Search .................. None
See application file for complete search history.

(56) References Cited

U.S. PATENT DOCUMENTS

2003/0134650 A1* 7/2003 Sundar et al. ............... 455/465
2004/0090930 A1* 5/2004 Lee et al. .................... 370/328

FOREIGN PATENT DOCUMENTS

| EP | 1513288 A | 3/2005 |
|---|---|---|
| EP | 1530321 A | 5/2005 |
| JP | 2005-142907 | 6/2005 |

OTHER PUBLICATIONS

Communication dated Oct. 4, 2006 including European Search Report dated Sep. 26, 2006 (total 6 pages).
Arora N et al, "PGSP: a protocol for secure communication in peer-to-peer system", Wireless Communications and Networking Conference, Mar. 13, 2005.

* cited by examiner

*Primary Examiner*—Nick Corsaro
*Assistant Examiner*—Joel Ajayi
(74) *Attorney, Agent, or Firm*—Yokoi & Co., U.S.A., Inc.; Peter Ganjian

(57) ABSTRACT

The present invention prevents a third party's impersonation while wireless communication is established for security setting. An access point, which performs a security setting process for wireless communication with a wireless LAN terminal by means of wireless communication, receives a start instruction for the security setting process and wirelessly receives start instruction data that indicates the start of the security setting process. The security setting process is not performed if the start instruction data is received before the receipt of the start instruction. The security setting process is performed if the start instruction data is not received before the receipt of the start instruction.

9 Claims, 5 Drawing Sheets

SECURITY SETTING SYSTEM

BACKGROUND OF THE INVENTION

1. Field of the Invention

The present invention relates to a technology for performing setup to provide enhanced security when wireless communication is established between a wireless LAN terminal and an access point.

2. Description of the Prior Art

Wireless LAN communication has been widespread in recent years because it provides increased user-friendliness with no limitation imposed by the use of physical wiring. However, an attempt can be made, for instance, to wirelessly gain illegal access to a network because wireless communication can be established. Therefore, the necessity for providing means for avoiding such illegal access is pointed out. Under these circumstances, various security technologies have been developed. Although various security technologies are proposed, it is preferred that security be also provided for wireless communication that is established to perform security setting. A technology disclosed, for instance, by Japanese Patent Application Laid-Open (JP-A) No. 2005-142907 provides such security.

As described above, various security technologies have been developed. In reality, however, it is difficult to provide perfect security. It is hoped that progress will be made constantly to provide enhanced security. When, for instance, security is to be provided for a situation where wireless communication is established to perform security setting as described above, enhanced security can be provided by safeguarding against a third party's impersonation.

SUMMARY OF THE INVENTION

Under the above circumstances, it is an object of the present invention to solve the above problem and provide security for wireless communication that is established to perform security setting.

To address the above problem, the present invention adopts an access point configuration for preventing a third party from impersonating a wireless LAN terminal user. More specifically, in a configuration in which an access point receives a security setting process start instruction and a security setting process begins in compliance with such a start instruction, the security setting process is not performed if start instruction data transmitted from a wireless LAN terminal is received before the start instruction is issued, and the security setting process is performed if the start instruction data transmitted from the wireless LAN terminal is not received before the start instruction is issued.

As a result, the security setting process is performed only when the start instruction data transmitted from the wireless LAN terminal is not received by the access point before the security setting process start instruction is issued. More specifically, the security setting process is performed in a situation where an access point side start instruction reception unit, which is provided for the access point, has received the start instruction, and an access point side wireless communication unit has received the start instruction data that is transmitted from the wireless LAN terminal.

In other words, to perform security setting with wireless communication established between the access point and wireless LAN terminal, the access point side start instruction reception unit needs to recognize that it should enter a security setting mode, and receive the start instruction data to recognize that the wireless LAN terminal is in the security setting mode. The employed configuration is such that a start instruction data reception unit receives the start instruction data. However, if a start instruction data reception wait process is performed simply without imposing any limitations and the security setting process is performed upon receipt of the start instruction data, a third party may gain illegal access.

A third party who attempts to illegally access the access point is unable to know that the security setting process start instruction is issued to the access point. However, if the third party impersonates a wireless LAN terminal user and keeps on transmitting illegal start instruction data, the security setting process is initiated relative to the third party's wireless LAN terminal in accordance with the illegal start instruction data when the security setting process start instruction is issued to the access point.

Therefore, if the access point side start instruction reception unit has received the start instruction data before it receives the start instruction, the present invention does not perform the security setting process. Thus, even if any third party constantly transmits illegal start instruction data as described above, the security setting process does not start in accordance with such illegal start instruction data. As a result, it is possible to prevent a third party from gaining illegal access.

At the access point, the security setting process is performed with wireless communication established. The object of the security setting process is to provide security for the wireless communication between the access point and wireless LAN terminal. Therefore, various processes can be performed. For example, it is possible to adopt a configuration in which wireless communication is established between the access point and wireless LAN terminal in compliance with wireless LAN regulations to exchange the information necessary for wireless communication security setting mode and let the access point and wireless LAN terminal perform setup in accordance with the information.

The information required for security setting mode includes the entire information necessary for security enhancement setup such as the information for authentication of various wireless LAN terminals, an encryption key for encrypting a transmission, and the employed encryption scheme. It goes without saying that WEP (Wired Equivalent Privacy), WPA-PSK (TKIP), WPA-PSK (AES), and various other schemes can be used as the encryption scheme. When the information is to be transmitted/received, a publicly known encryption scheme may be used to encrypt data.

Further, a setup for wireless communication may be performed simultaneously with the security setting process. At the access point and wireless LAN terminal, a frequency band conforming to a plurality of standards can be used and an apparatus capable of transmitting/receiving data on a plurality of channels exists. Therefore, setup may be performed so that the information indicating, for instance, a frequency band and channels for wireless communication may be mutually exchanged to use a common frequency band and channels, or that one apparatus transmits the information to another in order to use a common frequency band and channels.

Since the access point side wireless communication unit should be able to establish wireless communication with the wireless LAN terminal, various configurations can be adopted. For example, a configuration may be adopted so as to use a device that transmits/receives a wireless signal in compliance with predetermined regulations. The access point side start instruction reception unit should be able to receive a start instruction for the security setting process. It may be configured, for instance, so that a button is pressed to issue a start instruction or configured as an input device that is capable of issuing a start instruction. Further, the input device (mouse, keyboard, etc.) of a computer that is connected to the access point may be used to issue a start instruction. Various configurations can be adopted.

The start instruction data reception unit should be able to receive the start instruction data via the access point side wireless communication unit. Therefore, the start instruction data reception unit should be able to reference the data received by the access point side wireless communication unit, recognize that the data is the start instruction data, and acquire the data. For example, a configuration may be adopted so as to recognize the data that is added to a start instruction data packet header and payload to indicate that the data is the start instruction data. It goes without saying that the start instruction data may be in a format conforming to various communication protocols. Further, arbitrary data may be contained in the payload. Therefore, the payload may be used to transmit/receive the data necessary for the security setting process and the data necessary for wireless communication setup.

The access point side security setting mode unit performs the security setting process. However, the access point side security setting unit should be able to judge before proceeding to perform the security setting process whether it should proceed to perform the security setting process. The present invention must not perform the security setting process if the start instruction data is transmitted from the wireless LAN terminal before the start instruction is issued by the access point side start instruction reception unit. Therefore, it should be possible at least to judge whether a wirelessly received packet is the start instruction data, and compare the reception timing with the timing of start instruction issuance by the access point side start instruction reception unit.

Further, a configuration may be adopted so as to provide enhanced security for the access point. For example, the configuration may be formed so that the access point side wireless communication unit does not output data indicating that the security setting process is being performed (including the data indicating that the security setting process can be performed). A certain configuration employed for a conventional access point is such that various signals indicating that the access point is performing or ready to perform a security setting process (including a beacon signal for local position recognition) are transmitted.

When the above configuration is employed, a third party can receive the above various signals and realize that the access point is ready to perform security setting. In the present invention, however, the access point does not output the above various signals, but simply waits for the start instruction data from the wireless LAN terminal. In this instance, the third party cannot realize that the access point is ready to perform security setting. As a result, enhanced security is provided.

For security enhancement, another configuration may be adopted so that an access point, which is capable of establishing wireless communication on a plurality of channels, uses only a specific channel to receive the start instruction data and establish communication for the security setting process. When only a specific channel is used as described above, it might seem that the communication could be illegally received. However, when such a specific channel is used within a configuration according to the present invention, it is possible, in reality, to provide an extremely high degree of security.

In a communication system in which wireless communication can be established on a plurality of channels, a channel scan may be conducted prior to initial communication establishment. If, for instance, the employed configuration is such that the wireless LAN terminal performs a channel scan prior to initial communication establishment, the access point must respond to the channel scan on the currently used channel. If a third party receives the response of the access point and intercepts the communication before the end of the response, the wireless LAN terminal does not terminate the channel scan, but continuously performs the channel scan.

If, in reply to the response of the access point, a third party illegally impersonates a wireless LAN terminal user and performs the subsequent security setting process, the third party can establish wireless communication between the access point and an illegal wireless LAN terminal. However, when the employed configuration is such that a specific channel is used for perform security setting in a situation where communication can be established on a plurality of channels as described above, there is no need to perform a channel scan. Consequently, it is possible to avoid impersonation, which is described above.

In a configuration in which a channel scan is conducted as described above, the scan is generally performed in a predetermined sequence. If, in this instance, a third party recognizes that a channel scan is being performed, the third party can perform a channel scan with a later channel handled as a start channel. As a result, the third party can perform a channel scan ahead of the predefined channel scan. Consequently, the access point may respond to the third party's channel scan. In this instance, too, impersonation may occur. However, if the employed configuration is such that a specific channel is used for security setting, there is no need to conduct a channel scan and it is possible to avoid impersonation, which is described above.

The present invention provides enhanced security for a situation where security setting is performed between the access point and wireless LAN terminal. Therefore, it is possible not only to provide enhanced security for the access point as described above, but also to provide enhanced security for the wireless LAN terminal. More specifically, to initiate the security setting process at the access point in accordance with the start instruction data and perform security setting by means of wireless communication, the access point transmits the start acceptance data at the beginning of the security setting process.

Upon receipt of the start acceptance data, the wireless LAN terminal initiates the security setting process. However, if a plurality of start acceptance data are received, the wireless LAN terminal does not initiate the security setting process. Therefore, even if a third party impersonates the access point and transmits the start acceptance data in order to perform the security setting process in relation to the wireless LAN terminal, the wireless LAN terminal aborts the security setting process. Therefore, impersonation fails so that enhanced security results.

As is the case with the access point, the wireless LAN terminal also performs a security setting process by means of wireless communication. This security setting process is executed to perform setup for the purpose of providing security for the wireless communication between the access point and wireless LAN terminal. Therefore, various processes can be performed as described earlier. It goes without saying that the wireless LAN terminal may perform wireless communication setup simultaneously with the security setting process.

The terminal side wireless communication unit should be capable of establishing wireless communication with the access point. As is the case with the access point side wireless communication unit, various configurations can be employed for the terminal side wireless communication unit. As is the case with the access point side start instruction reception unit, the terminal side start instruction reception unit should be capable of receiving the security setting process start instruction. Therefore, it may be configured, for instance, so that a button is pressed to issue a start instruction or configured as an input device that is capable of issuing a start instruction. Further, an input device (mouse, keyboard, etc.) that is connected to the wireless LAN terminal may be used to issue a start instruction. Various configurations can be adopted.

The start instruction data transmission unit should be capable of transmitting the start instruction data via the terminal side wireless communication unit. Therefore, it should be able to generate data for indicating that the data to be transmitted is the start instruction data, and use the terminal side wireless communication unit to transmit the start instruction data. For example, data may be added to a start instruction data packet header and payload to indicate that the data to be transmitted is the start instruction data. It goes without saying that the start instruction data may be in a format conforming to various communication protocols. Further, arbitrary data may be contained in the payload. Therefore, the payload may be used to transmit/receive the data necessary for the security setting process and the data necessary for wireless communication setup.

In the start acceptance data reception unit, the terminal side wireless communication unit should be capable of receiving the start acceptance data transmitted from the access point. Therefore, the start acceptance data reception unit should be capable of referencing the data received by the terminal side wireless communication unit, recognizing that the received data is the start acceptance data, and acquiring the start acceptance data. For example, a configuration may be adopted so as to recognize the data that is added to a start acceptance data packet header and payload to indicate that the data is the start acceptance data. It goes without saying that the start acceptance data may be in a format conforming to various communication protocols. Further, arbitrary data may be contained in the payload. Therefore, the payload may be used to transmit/receive the data necessary for the security setting process and the data necessary for wireless communication setup.

The terminal side security setting unit performs the security setting process. However, the terminal side security setting unit should be able to judge before the security setting process whether it should proceed to perform the security setting process. The present invention should judge the number of start acceptance data. If a plurality of start acceptance data (start acceptance data transmitted from a plurality of wireless LAN terminals) are received, the present invention should not perform the security setting process. Therefore, the present invention should be capable of at least judging whether a packet received by means of wireless communication is start acceptance data, and recognizing the number of start acceptance data.

Whether a plurality of start acceptance data are received can be judged, for instance, by adopting a configuration in which a period of time during which a wait process for start acceptance data reception is performed is predefined to judge whether a plurality of start acceptance data are received during the predefined period of time. Further, the adopted configuration is such that even if start acceptance data is received after the elapse of the predefined period of time, the security setting process is not performed for such start acceptance data.

As described above, the present invention causes either or both of the access point and wireless LAN terminal to prevent a third party's illegal impersonation for security enhancement purposes. Since these apparatuses performs the security setting process by means of wireless communication, it is preferred that enhanced security be also provided for such wireless communication. As such being the case, the employed configuration may be such that the wireless LAN terminal transmits a public key together with the start instruction data and that communication is subsequently established while the public key is used for encryption.

In other words, to transmit the start instruction data for the security setting process, it is necessary for the present invention to transmit the start instruction data in a situation where security setting is not performed yet. Therefore, the start instruction data is transmitted without being encrypted. However, if a public key is transmitted at the time of start instruction data transmission and then the data encrypted by the public key is received and decrypted with the associated secret key, the data received by the wireless LAN terminal can be maintained secret to provide enhanced security. It goes without saying that the access point encrypts the start acceptance data in accordance with the data that indicates the public key.

When the employed configuration uses the above-mentioned public key, it is preferred that the data indicating the public key provide each security setting process with a unique public key. In such a configuration, the terminal side start instruction reception unit within the wireless LAN terminal should generate and transmit the data indicating a public key, which changes each time the start instruction for the security setting process is received.

Various configurations can be employed to generate unique public keys. It is preferred that the terminal side start instruction reception unit generate a random number each time the start instruction for the security setting process is received, and that a public key be created in accordance with the generated random number. It goes without saying that a secret key, which is paired with the public key, must be created when the public key is generated. When the configuration described above is adopted, it is possible to minimize the possibility of public key leakage to a third party.

Further, when the employed configuration is such that the access point generates the start acceptance data and transmits it to the wireless LAN terminal, a public key may be generated together with the start acceptance data and transmitted to the wireless LAN terminal. When the wireless LAN terminal receives the generated public key, the data subsequently output from the wireless LAN terminal can be encrypted to provide enhanced security.

Further, when the access point transmits the start acceptance data and public-key-indicating data to the wireless LAN terminal, the public key transmitted earlier together with the start instruction data from the wireless LAN terminal to the access point is used for encryption purposes. The start acceptance data and public key output from the access point can be encrypted. It is possible to minimize the possibility with which the data transmitted from the access point may leak to a third party.

The present invention establishes wireless communication for security setting purposes. It is therefore preferred that such communication be encrypted. In a configuration in which the access point is requested to furnish the data necessary for security setting via the terminal side wireless communication unit of the wireless LAN terminal and security setting is performed in accordance with the response from the access point, a public key (response public key data) for encrypting the response to the request may be transmitted each time the request is made.

The configuration described above can encrypt all responses with different public keys. Therefore, it is possible to minimize the possibility of information leakage and the possibility of decryption by a third party. It goes without saying that when the above-mentioned request is to be made, it may be encrypted with a public key that is transmitted beforehand from the access point. Another alternative is to let the access point generate a different public key each time a response is sent in reply to the request and transmit the public key together with the response.

The configuration described above can encrypt all requests with different public keys. Therefore, it is possible to minimize the possibility of information leakage and the possibility of decryption by a third party. When the public key and secret key are used for encryption purposes as described above, it is possible not only to provide enhanced information secrecy, but also to confirm whether the transmitting person is authentic. Consequently, the possibility of impersonation can be minimized.

To provide enhanced security, the wireless LAN terminal that is capable of establishing wireless communication on a plurality of channels may transmit the start instruction data, receive start acceptance data, and establish communication for the security setting process on a specific channel only. When only a specific channel is used as described above, it might seem that the communication could be illegally received. However, when such a specific channel is used within a configuration according to the present invention, it is possible, in reality, to provide an extremely high degree of security. More specifically, in a communication system in which wireless communication can be established on a plurality of channels as described above, there is no need to perform a channel scan when communication is to be established for the first time. It is therefore possible to avoid impersonation, which is described above.

The present invention, which has been described above, can be implemented not only by an apparatus but also by a method and by a program that executes the process performed by the apparatus described above. Further, an apparatus, method, and program according to the present invention may be implemented on an individual basis or implemented together with another apparatus, method, and program while being incorporated in certain equipment. The present invention is not limited to the above description, but extends to various other aspects and modifications that fall within the scope of the appended claims.

A recording medium on which a program according to the present invention is recorded can also be offered. This program recording medium may be a magnetic recording medium or magnetooptical recording medium. Any recording medium that is developed in the future may also be used as the program recording medium. Further, the present invention is also applicable to a situation where it is implemented partly by software and partly by hardware. Part of the present invention may be stored on a recording medium and read as needed. All functions need not be executed by a single program. They may be executed by a plurality of programs. In such an instance, the functions should be executed by a plurality of computers.

Other and further objects, features and advantages of the invention will appear more fully from the following description.

DESCRIPTION OF THE PREFERRED EMBODIMENTS

Figure 1:
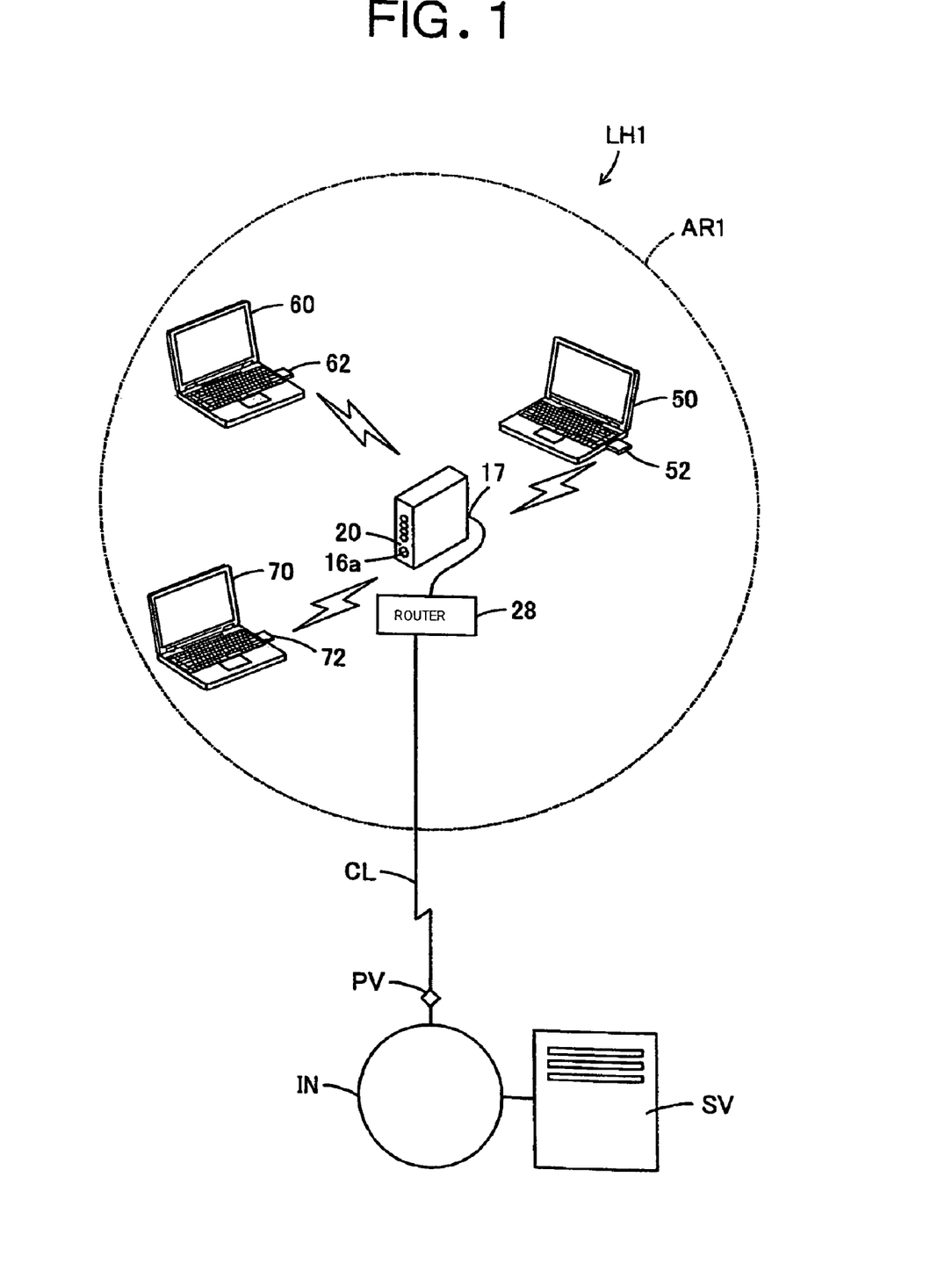
FIG. 1 illustrates a hardware configuration that implements a security setting system according to a first embodiment of the present invention.
Figure 2:
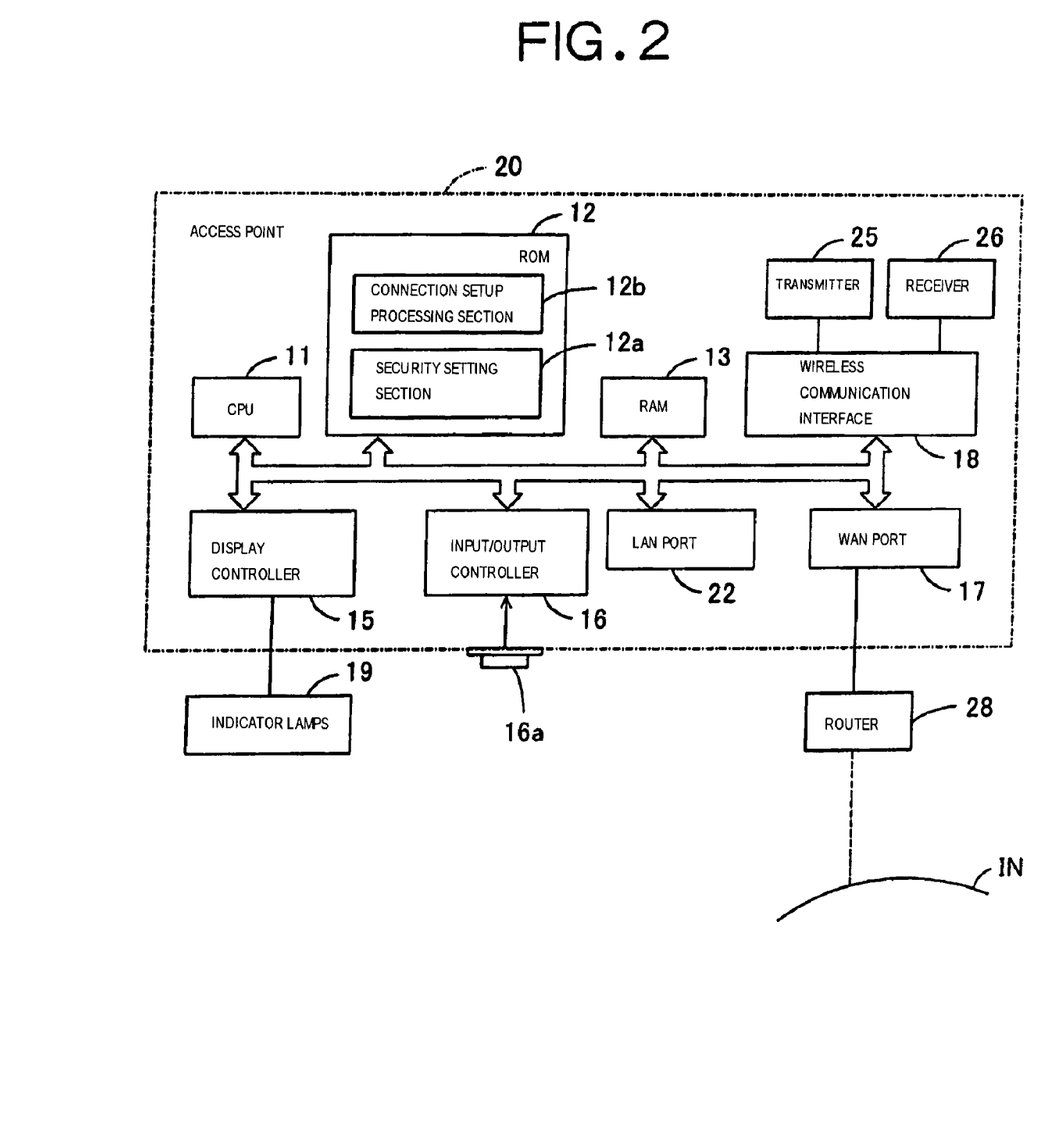
FIG. 2 illustrates the configuration of an access point.
Figure 3:
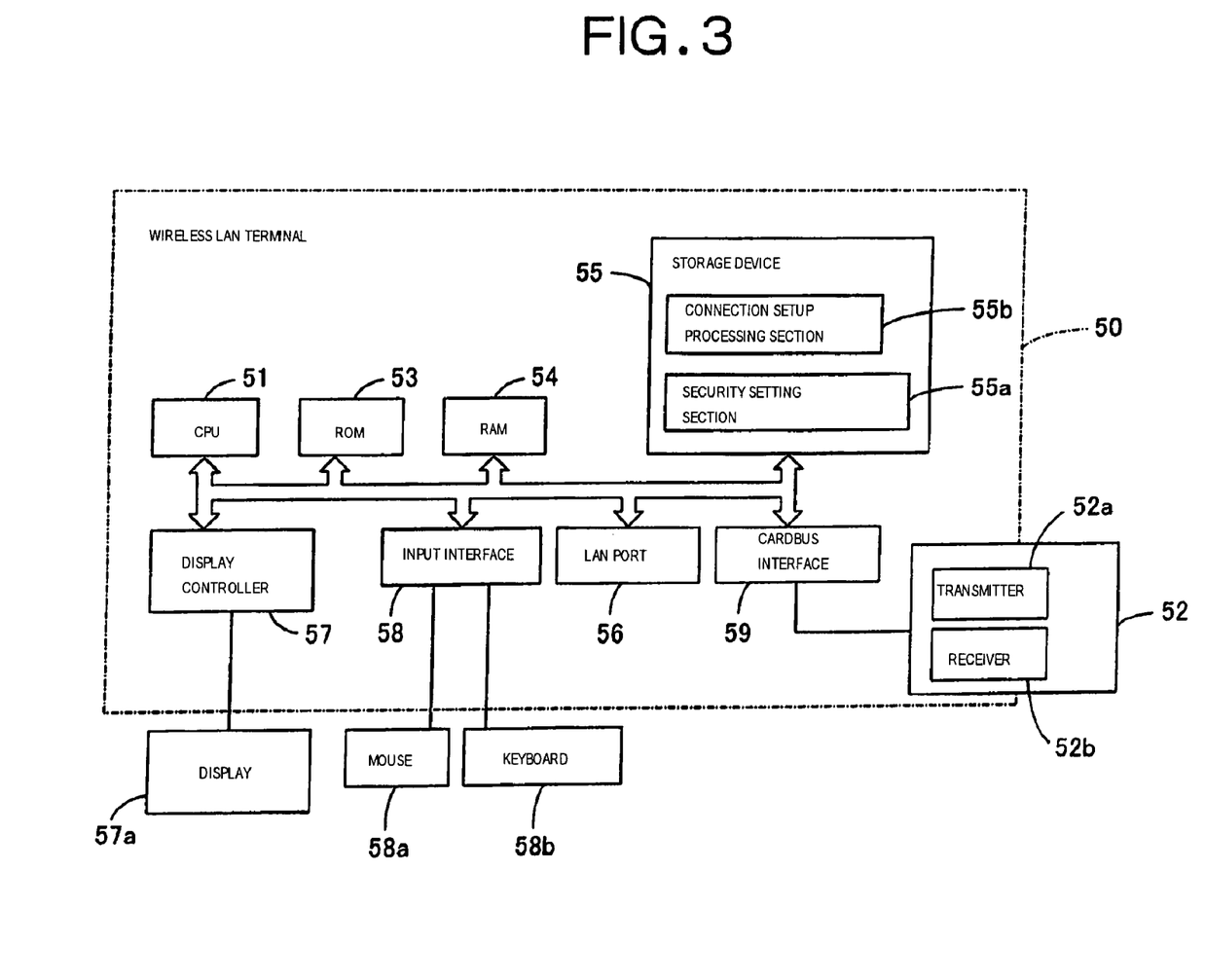
FIG. 3 illustrates the configuration of a wireless LAN terminal.

Embodiments of the present invention will now be described in the following sequence in order to clarify the configuration and operation of the present invention, which has been summarized above:
A. First Embodiment (Security setting system)
A-1. Security setting system Overview
A-2. Security setting process
B. Modified Embodiments A. First Embodiment A-1. Security Setting System Overview FIG. 1 illustrates a hardware configuration that implements a security setting system according to a first embodiment of the present invention. FIG. 2 illustrates the configuration of an access point. FIG. 3 illustrates the configuration of a wireless LAN terminal. The security setting system LH1 includes wireless LAN terminals 50, 60, 70 and an access point 20. After completion of security setting, the wireless LAN terminals and access point use a common WEP key and establish wireless communication within a wireless communication area AR1 while maintaining security.

As shown in FIG. 1, the access point (wireless base station) 20, which is a wireless LAN repeater, is installed in the wireless communication area AR1. As shown in FIG. 2, the access point 20 includes a CPU 11, a ROM 12, a RAM 13, a WAN port 17, which serves as a network interface, a LAN port 22 for connecting to a wired LAN, a wireless communication interface 18, a display controller 15, and an input/output controller 16. The ROM 12, RAM 13, WAN port 17, LAN port 22, wireless communication interface 18, display controller 15, and input/output controller 16 are connected to the CPU 11 via a bus.

The ROM 12 stores various programs for communicating with the wireless LAN terminals 50, 60, 70 in the wireless communication area AR1 or connecting to the Internet IN and a server SV, and data necessary for executing such programs. In FIG. 2, a security setting section 12a and a connection setup processing section 12b are shown as parts of such programs and data. The security setting section 12a performs a security setting process. The connection setup processing section 12b performs setup for wireless communication establishment.

The input/output controller 16 is connected to a push button 16a. The button 16a is installed in such a manner that its push section is exposed over the housing surface of the access point 20. The display controller 15 is connected to various indicator lamps 19, which blinks or steadily glows to indicate the wireless LAN connection status and communication status.

The wireless communication interface 18 is connected to a transmitter 25 for radio wave transmission and a receiver 26 for radio wave reception. The transmitter 25 and receiver 26 are incorporated in the access point 20 in such a manner as to transmit radio waves to the outside and receive radio waves from the outside. In FIG. 1, the wireless communication area AR1 represents an area where radio waves transmitted from the transmitter 25 arrive and the receiver 26 receives radio waves transmitted from the wireless LAN terminals 50, 60, 70. The transmitter 25 and receiver 26 according to the present embodiment can transmit/receive radio waves on a plurality of channels. Wireless communication is established on one of the plurality of channels. In the present embodiment, the transmitter 25 and receiver 26 constitute the access point side start instruction reception unit.

The WAN port 17 is connected to a modem-incorporated router 28 via a cable. The router 28 can identify and differentiate the plurality of wireless LAN terminals 50, 60, 70 within a wireless LAN in accordance with the MAC addresses of wireless LAN adapters 52, 62, 72, which will be described later. The modem in the router 28 is connected to the Internet IN via a CATV line, xDSL line, or other communication line CL and a dedicated line of a provider PV. In other words, the router 28 functions as a gateway for connecting the wireless LAN to the Internet IN.

The wireless LAN terminals 50, 60, 70 shown in FIG. 1 are well-known notebook personal computers. In FIG. 3, the configuration of wireless LAN terminal 50 is shown as an example. The same configuration can be employed for wireless LAN terminals 60 and 70 to exercise the same functions. As shown in FIG. 3, wireless LAN terminal 50 includes a CPU 51, a ROM 53, a RAM 54, a nonvolatile storage device 55 (e.g., hard disk drive), a LAN port 56 for connecting to a wired LAN, a display controller 57, an input interface 58, and a CardBus interface 59. The ROM 53, RAM 54, nonvolatile storage device 55, LAN port 56, display controller 57, input interface 58, CardBus interface 59 are connected to the CPU 51 via a bus.

Wireless LAN terminal 50 transfers a program stored in the storage device 55 to the RAM 54. The CPU 51 can perform a calculation process to execute the program. In the present embodiment, the storage device 55 stores various programs for communicating with the access point 20 or connecting to the Internet IN, and data necessary for executing such programs. In FIG. 3, a security setting section 55a and a connection setup processing section 55b are shown as parts of such programs and data. The security setting section 55a performs a security setting process. The connection setup processing section 55b performs setup for wireless communication establishment.

The display controller 57 is connected to a display 57a, which belongs to wireless LAN terminal 50. The display 57a can display various information, including a UI that operate in connection with a program. The input interface 58 is connected to a mouse 58a and a keyboard 58b. The input interface 58 can acquire the information about operations that are performed by the mouse 58a and keyboard 58b. The CardBus interface 59 is connected to wireless LAN adapter 52, which is equipped with a transmitter 52a and a receiver 52b. The transmitter 52a and receiver 52b are used to establish wireless communication with the access point 20.

In wireless LAN adapter 52, too, the transmitter 52a and receiver 52b can transmit/receive radio waves on a plurality of channels. Wireless communication is established on one of the plurality of channels. In the present embodiment, wireless LAN adapter 52 constitutes the terminal side wireless communication unit. It goes without saying that mobile information wireless LAN terminal (personal digital assistant), or other terminals may be employed as a wireless LAN terminal other than a personal computer.

A-2. Security Setting Process

By employing the configuration described above, the wireless LAN terminals 50, 60, 70 access the Internet IN via the access point 20. In the present embodiment, however, a WEP key is used to encrypt the contents of communication as described earlier. In the present embodiment, therefore, a security setting process is performed to set the WEP key before the wireless LAN terminals 50, 60, 70 communicate with the access point 20.

Figure 4:
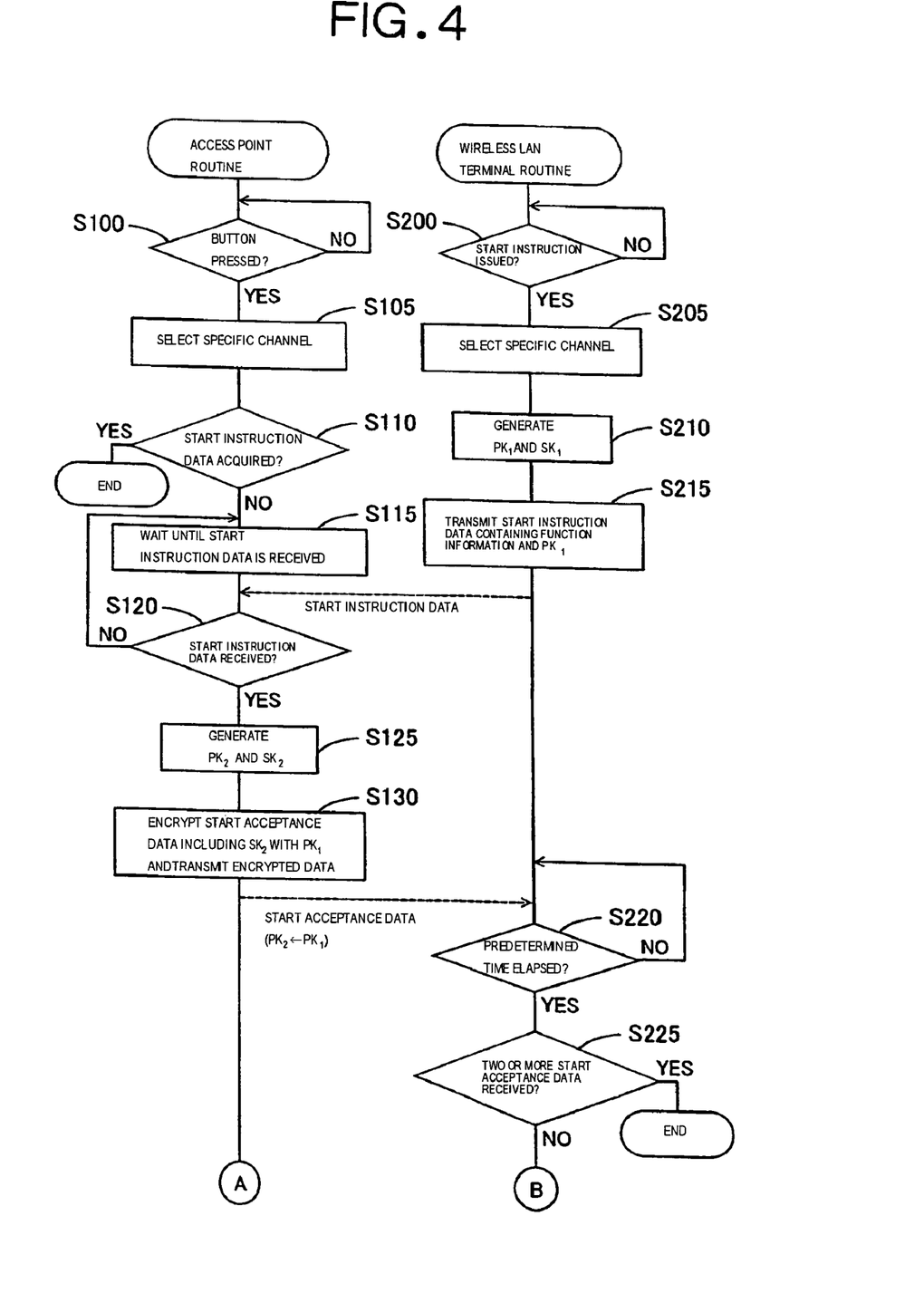
FIG. 4 is a flowchart illustrating a security setting process.
Figure 5:
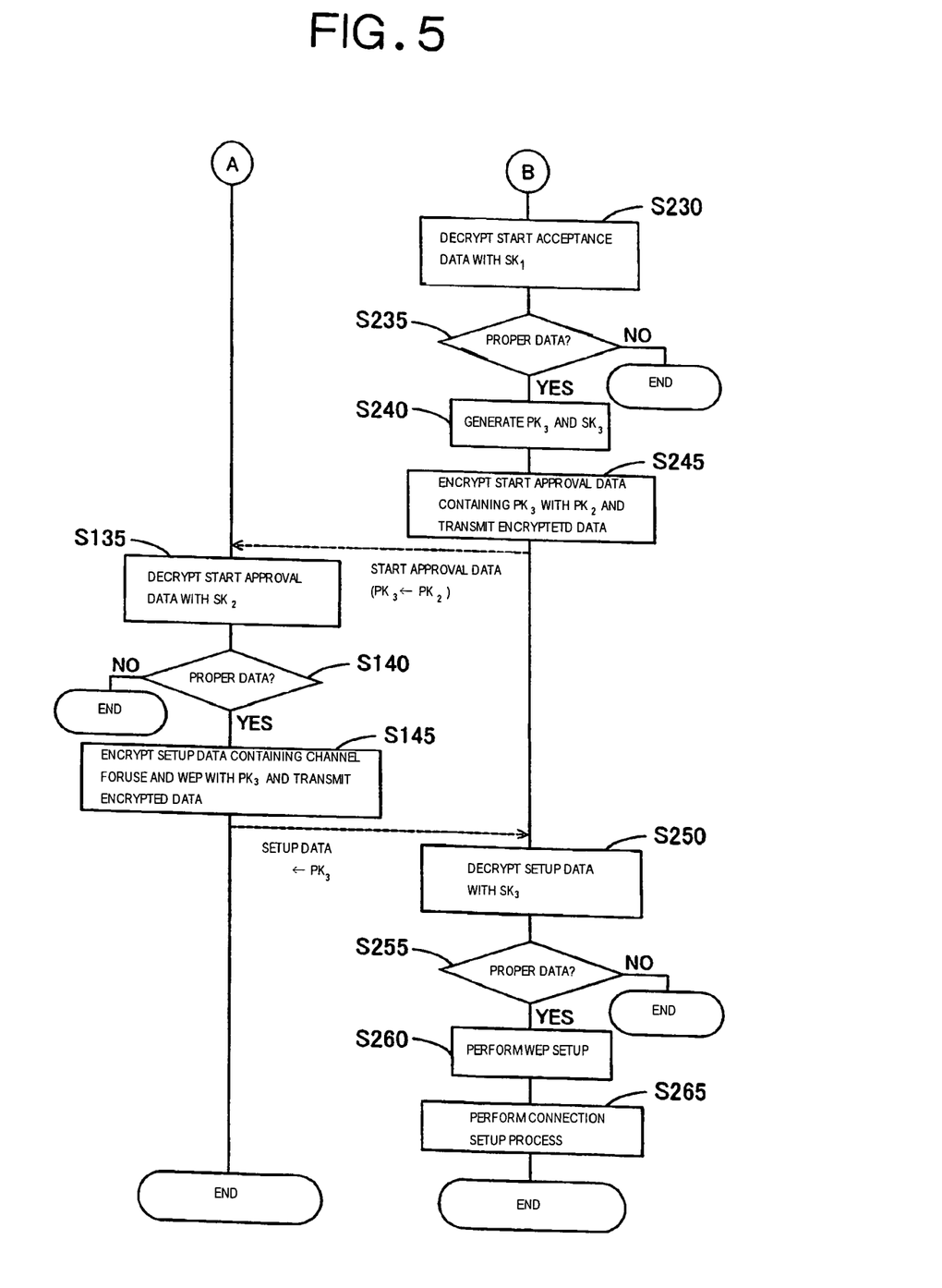
FIG. 5 is a flowchart illustrating a security setting process.

FIGS. 4 and 5 are flowcharts illustrating the security setting process. In the security setting process, preprocessing is performed to assure communication secrecy before the WEP key is set. This preprocessing operation prevents a third party from gaining illegal access. In other words, once the WEP key is set, communication secrecy is assured. However, when WEP key setup is being performed by means of wireless communication, the WEP key is not set yet. Therefore, the WEP key cannot assure secrecy yet. Under these circumstances, the present embodiment causes the access point 20 and wireless LAN terminal 50 to perform preprocessing for a WEP key setup process.

A wireless communication program (not shown) is constantly running in the access point. The wireless communication program is controlled so as to establish wireless communication between the access point 20 and a wireless LAN terminal for which the above-mentioned WEP key setup and communication channel setup operations are completed. This wireless communication program performs an interrupt process when the button 16a is pressed. Step S100 is performed to detect whether the button 16a is pressed. In the present embodiment, the button 16a and the process performed in step S100 constitute the access point side start instruction reception unit.

When it is found in step S100 that the button 16a is pressed, the wireless communication program is interrupted and the security setting section 12a initiates a process. The security setting section 12a first performs step S105 to set a predetermined specific channel as the channel for wireless communication. Next, the security setting section 12a judges whether the start instruction data is already acquired (step S110). In other words, the wireless communication program (not shown) is constantly running in the access point 20 as described above so that a certain wireless communication packet can be acquired. When a certain wireless communication packet is acquired, its data is buffered into the RAM 13.

The security setting section 12a then acquires the buffered data and judges whether the start instruction data is already acquired. If it is found in step S110 that the start instruction data is already acquired, the access point 20 terminates the process of the security setting section 12a and does not perform WEP key setup. In this instance, the access point 20 resumes the process of the wireless communication process (not shown). In the present embodiment, the process performed in step S110 precedes the security setting process that is performed by the start instruction data reception unit and access point side security setting unit.

It is preferred that an indicator lamp 19 issue a warning before the process of the wireless communication program is resumed, and that the button 16a be inoperative for a certain period of time, and further that the process of the wireless communication program be not resumed until the warning is explicitly canceled. If it is found in step S110 that the start instruction data is already acquired, steps S115 and beyond are followed to perform the security setting process.

At wireless LAN terminal 50, on the other hand, the user operates the mouse 58a or the like and uses a UI (not shown) or the like to issue instructions for starting the security setting process. Wireless LAN terminal 50 performs step S200 to judge whether the start instruction is issued. If the obtained judgment result indicates that the start instruction is issued, the security setting section 55a begins to perform a process. In the present embodiment, the process performed in step S200 corresponds to the terminal side start instruction reception unit.

The security setting section 55a first performs step S205 to select a predetermined specific channel as the channel for wireless communication. The channel for wireless LAN terminal 50 is the same as the channel selected for the access point 20 in step S105.

Next, wireless LAN terminal 50 performs step S210 to generate public key $PK_1$ for information encryption and secret key $SK_1$ for decryption. In the present embodiment, a random number is generated. Public key $PK_1$ and secret key $SK_1$ that is paired with public key $PK_1$ are generated. Therefore, public key $PK_1$ and secret key $SK_1$ are updated each time the judgment result obtained in step S200 indicates that the start instruction is issued. After public key $PK_1$ and secret key $SK_1$ are generated, the data indicating them is recorded in the RAM 54.

Further, the security setting section 55a acquires function information that indicates the functions of wireless LAN adapter 52, and transmits the start instruction data together with the data indicating public key $PK_1$ (step S215). In the present embodiment, the start instruction data includes the information indicating that the start instruction is issued, the above-mentioned function information, and public key $PK_1$. The start instruction data can be organized as a probe request packet. In this instance, the payload of the probe request packet should include a flag for indicating that the start instruction is issued, and the data indicating the above-mentioned function information and public key $PK_1$. The function information includes a frequency band (e.g., 2.4 GHz band or 5 GHz band) available for wireless communication and the settings for available channels for the wireless LAN adapter 52 of wireless LAN terminal 50. In the present embodiment, the process performed in step S215 corresponds to the start instruction data transmission unit.

The security setting process can be performed only when steps S100 to S110 and steps S200 to S215 are followed to press the button 16a of the access point 20 and cause wireless LAN terminal 50 to issue a start instruction later. In this manner, it is possible to prevent a third party from gaining illegal access. In other words, wireless LAN terminal 50 does not transmit the start instruction data until a start instruction is issued by the mouse 58a or other input device connected to wireless LAN terminal 50. Therefore, when the user performing security setting presses the button 16a at the access point 20 and wireless LAN terminal 50 observes a start instruction agreement immediately after the press of the button 16a, all the start instruction data received earlier by the access point 20 can be judged illegal.

The access point 20 according to the present embodiment does not perform the security setting process if any existing start instruction data was received before the button 16a on the access point 20 was pressed. Therefore, even if any third party frequently outputs the start instruction data in order to gain illegal access, no security setting will be performed in relation to a wireless LAN terminal possessed by the third party.

If the user inadvertently issues the start instruction for wireless LAN terminal 50 before pressing the button 16a on the access point 20, the security setting process is not performed. However, if, in this instance, the button 16a on the access point 20 is pressed earlier after performing the process for the access point 20 all over again, the security setting process can be performed subsequently.

The present embodiment establishes wireless communication on a specific channel for the security setting process as described earlier in order to provide a system that strongly safeguards against illegal access. In a wireless LAN, a channel scan is generally conducted when a probe request is made before wireless communication setup or security setting. However, the present embodiment does not have to conduct the channel scan because it uses a predetermined channel. Further, the access point 20 according to the present embodiment does not have to respond to a channel scan. As a result, no third party can illegally receive a response from the access point or conduct a channel scan earlier than a legal one. Thus, the present embodiment successfully avoids impersonation.

In the present embodiment, the access point 20 receives the start instruction data. However, even if the button is pressed in step S100, the access point 20 does not transmit a beacon signal, which is used to locate the position of the access point 20. Therefore, no third party can detect the beacon signal to recognize the beginning of security setting. Consequently, no third party can determine the timing with which an attempt should be made to interrupt the security setting process. Thus, the present embodiment can minimize the possibility with which a third party gains illegal access.

After a preprocessing operation is performed to prevent the access point 20 from being illegally accessed, in the present embodiment, the security setting section 12a of the access point 20 performs a reception wait process for receiving the start instruction data (step S115) and then repeatedly performs the reception wait process until it is judged that the start instruction data is received (step S120). More specifically, the security setting section 12a determines the contents of the packet received via the receiver 26, and then performs step S215 to judge whether the start instruction data is transmitted from wireless LAN terminal 50.

If the judgment result obtained in step S120 does not indicate that the start instruction data is transmitted from wireless LAN terminal 50, the received packet is discarded and then steps S115 and beyond are repeated. If, on the other hand, the judgment result obtained in step S120 indicates that the start instruction data is transmitted from wireless LAN terminal 50, steps S125 and beyond are performed. When a predetermined period of time elapses in steps S115 and S120, the reception wait process may be aborted or an indicator lamp 19 may issue a warning. When the above process is performed, the security setting process can be aborted if radio waves from wireless LAN terminal 50 are intercepted.

Step S125 is performed to generate public key $PK_2$ for information encryption and secret key $SK_2$ for decryption. In this instance, too, a random number is generated in the same manner as described earlier. Public key $PK_2$ and secret key $SK_2$, which is paired with public key $PK_2$, are generated in accordance with the random number. Therefore, public key $PK_2$ and secret key $SK_2$ are updated for each processing operation. These data are recorded in the RAM 13.

Next, the security setting section 12a generates the start acceptance data, which includes the data indicating public key $PK_2$, encrypts the generated data with public key $PK_1$, and transmits the encrypted data (step S130). The start acceptance data is the information indicating that the start instruction data is accepted, and is a response to the start instruction data. Therefore, when the start instruction data is a probe request, it may be organized as a probe response packet. In this instance, the payload of the probe response packet should include a flag for indicating that the start instruction is accepted, and the data indicating public key $PK_2$. The pair of parenthesis below "Start acceptance data" at the lower central part of FIG. 4 indicates that public key $PK_2$ in the payload is encrypted with public key $PK_1$ (this also holds true for any subsequent pair of parenthesis).

To handle the start acceptance data, the security setting section 55a of wireless LAN terminal 50 performs a reception wait process for the start acceptance data. In this instance, step S220 is performed to judge whether a predetermined period of time elapses. Step S225 is then performed to judge whether two or more start acceptance data are received. More specifically, the data received by the receiver 52b are successively buffered in the RAM 54 in step S220 until the predetermined period of time elapses. Step S225 is performed to note the headers of the buffered data and judge whether single data or a plurality of data are transmitted. Whether single data or a plurality of data are transmitted can be determined, for instance, by checking whether the data are transmitted from a plurality of wireless LAN terminals.

If the judgment result obtained in step S225 indicates that two or more start acceptance data are received, the process terminates without continuing with the security setting process. Thus, it is possible to prevent a third party from gaining illegal access. More specifically, if the third party illegally receives the start instruction data transmitted in step S215 in order to impersonate the access point 20, it is conceivable that the third party may transmit the start acceptance data that is encrypted with the public key $PK_1$.

In this instance, however, the start acceptance data that was output from the access point 20 in step S130 also arrives at wireless LAN terminal 50. Therefore, there are two or more start acceptance data. In this situation, the present embodiment refrains from performing the security setting process in accordance with the judgment result obtained in step S225. Therefore, the third party fails in impersonation. If the judgment result obtained in step S225 does not indicate that two or more start acceptance are received, it means that only the start acceptance data transmitted from the access point 20 is received. Therefore, the security setting process is continuously performed in steps S230 and beyond. As a result, the security setting process can be performed with enhanced security provided. In the present embodiment, the process performed in steps S220 and S225 precedes the security setting process that is performed by the start acceptance data reception unit and terminal side security setting unit.

If the judgment result obtained in step S225 does not indicate that two or more start acceptance data are received, step S230 is performed to decrypt the start acceptance data with secret key $SK_1$. After decryption, step S235 is performed to judge whether the obtained data is meaningful and proper. If the judgment result obtained in step S235 does not indicate that the obtained data is proper, the security setting process is aborted. More specifically, if the obtained data cannot be decrypted with secret key $SK_1$, which is paired with public key $PK_1$, and is improper (the obtained data does not include a flag indicating a start acceptance and public key $PK_2$ written in a predetermined format), the process is aborted because the received data was not transmitted from the access point 20.

If, on the other hand, the judgment result obtained in step S235 indicates that the obtained data is proper, the RAM 54 records the data indicating public key $PK_2$. Further, step S240 is performed to generate public key $PK_3$ and secret key $SK_3$ for the purpose of continuing with the communication. In this instance, too, the security setting section 55a generates a random number, and then generates public key $PK_3$ and secret key $SK_3$, which is paired with public key $PK_3$, in accordance with the generated random number. Therefore, public key $PK_3$ and secret key $SK_3$ are updated for each processing operation. After public key $PK_3$ and secret key $SK_3$ are generated, the RAM 54 records the data indicating these keys.

Further, the security setting section 55a generates start approval data, which includes public key $PK_3$, encrypts the generated data with public key $PK_2$, and transmits the encrypted data (step S245). In the present embodiment, the start approval data is used to give an approval for transmitting the information required for security setting from the access point 20 to wireless LAN terminal 50. The start approval data can be organized, for instance, as an authentication request packet. In this instance, the payload of the authentication request packet should include a flag indicating the start approval and the data indicating public key $PK_3$.

When the access point 20 receives the start approval data, step S135 is performed to decrypt the start approval data with secret key $SK_2$. Step S140 is then performed to judge whether the decrypted data is proper. If the judgment result obtained in step S140 does not indicate that the obtained data is proper (the obtained data includes a flag indicating the start approval and public key $PK_3$, which is written in a predetermined format), the security setting process is aborted because the obtained data was not transmitted from a proper wireless LAN terminal 50.

If, on the other hand, the judgment result obtained in step S140 indicates that proper data is obtained, setup data containing the WEP key to be set at the wireless LAN terminal and the channel for communication use (it is preferred that the channel differ from the specific channel designated in steps S105 and S205) is generated. Step S145 is then performed to encrypt the setup data with public key $PK_3$ and transmit the encrypted data. The setup data can be organized, for instance, as an authentication response packet. In this instance, the payload of the authentication response packet should include the WEP key and the data indicating the channel for use. In the present embodiment, steps S115 to S145 correspond to the security setting process performed by the access point side security setting unit.

The channel for use is the setup data required for wireless connection establishment. The connection setup processing section 12b shown in FIG. 2 acquires a channel that is not used in the access point 20, and designates the unused channel as the channel for use. In this instance, the function information transmitted in step S215 is referenced to confirm that the frequency band used in the access point 20 can be used at wireless LAN terminal 50. Further, an unused channel within the used frequency band is handled as the channel for use.

When wireless LAN terminal 50 receives the setup data, step S250 is performed to decrypt the setup data with secret key $SK_3$. Step S255 is then performed to judge whether the obtained data is proper. If the judgment result obtained in step S255 does not indicate that the obtained data is proper (the data contains the WEP key and the channel for use), the security setting process is aborted because the obtained data was not transmitted from a proper access point 20.

If, on the other hand, the judgment result obtained in step S255 indicates that proper data is obtained, the security setting section 55a of wireless LAN terminal 50 records the WEP key in the storage device 55, and performs setup so as to use the WEP for subsequent wireless communications (step S260). Further, the connection setup processing section 55b performs a connection setup process so that the channel for use, which is contained in the setup data, will be used for subsequent wireless communications (step S265). In the present embodiment, steps S230 to S260 correspond to the terminal side security setting unit.

The above process has been performed to set the common WEP key for the access point 20 and wireless LAN terminal 50 and set a channel for wireless communication establishment. Therefore, the process shown in FIGS. 4 and 5 terminates, and the access point 20 returns to the wireless communication program (not shown). Therefore, when an application program for wireless communication is executed at wireless LAN terminal 50, it operates in connection with the wireless communication program (not shown) of the access point 20 to establish wireless communication.

As described above, the present embodiment assures communication secrecy by generating a different public key and secret key each time wireless LAN terminal 50 makes a request and a response is returned in reply to the request. Therefore, even if a third party attempts and successfully achieves decryption with the keys, it takes a considerable amount of time to complete decryption. It means that WEP key setup is completed before successful decryption and that the WEP key described above cannot be decrypted. As a result, the security setting process (WEP key setup process) can be completed while maintaining an extremely high degree of secrecy.

B. Modified Embodiments

The foregoing embodiment is one embodiment of the present invention. Various other embodiments may be used to perform security setting by means of wireless communication while preventing a third party from gaining illegal access. For example, the foregoing embodiment performs WEP key setup within the security setting process. Alternatively, however, setup may be performed for encryption based on a different method (TKIP, AES, public key cryptosystem, etc.).

The present invention is not limited to the use of wireless communication based on radio waves. The present invention can also be applied to infrared, optical, audio signal, ultrasonic, or other communication. It goes without saying that the present invention is applicable to a situation where the wireless communication between wireless LAN terminal 50 and access point 20 is based on Bluetooth (trademark).

The foregoing embodiment assumes that the WEP key is already set up at the access point 20 to complete setup for establishing wireless communication with a predetermined frequency band. Alternatively, however, either the access point 20 or wireless LAN terminal 50 may generate the WEP key and transmit the generated WEP key to the other side for setup purposes while the above-mentioned setup operation is not performed. Further, a selectable frequency band may be selected to let both sides to set up the selected frequency band and perform channel setup.

When the start instruction data is received in step S115 or S120 for the access point 20, the flow proceeds to the next processing step (step S125). Alternatively, however, a reception wait process may be performed for a predetermined period of time, and if two or more start instruction data are received, the security setting process may be aborted. When this alternative is employed, it is possible to prevent a third party from gaining illegal access even if the third party attempts to achieve impersonation by intercepting the start instruction data output from wireless LAN terminal 50 and generating and transmitting illegal start instruction data.

The foregoing embodiment assures communication secrecy by generating a different public key and secret key each time wireless LAN terminal 50 makes a request and a response is returned in reply to the request. In general, however, the time required for security setting process completion is extremely short. Therefore, the same public key and secret key may alternatively be used without generating a different public key and secret key each time the request and response are made. The use of this alternative also makes it possible to perform the security setting process while minimizing the possibility of allowing a third party to gain illegal access. The foregoing embodiment assumes that a random number is used to create a prime factorization type public key for the purpose of generating the public key and secret key. Alternatively, however, a discrete logarithm type public key may be created. Various configurations may be adopted.

The foregoing invention has been described in terms of preferred embodiments. However, those skilled in the art will recognize that many variations of such embodiments exist. Such variations are intended to be within the scope of the present invention and the appended claims.

What is claimed is:

1. A wireless LAN terminal for performing a security setting process for wireless communication with an access point by means of wireless communication, the wireless LAN terminal comprising:
   a terminal side wireless communication unit for establishing wireless communication with the access point;
   a terminal side start instruction reception unit for receiving a start instruction for the security setting process;
   a start instruction data transmission unit, which, upon receipt of the start instruction, allows the terminal side wireless communication unit to transmit start instruction data that indicates the start of the security setting process;
   a start acceptance data reception unit for receiving start acceptance data through the terminal side wireless communication unit, the start acceptance data transmitted from the access point during the security setting process initiated in accordance with the start instruction data and indicates that the start of the security setting process is accepted; and
   a terminal side security setting unit, which does not perform the security setting process if the start acceptance data reception unit receives a plurality of start acceptance data, and performs the security setting process if the start acceptance data reception unit receives only one start acceptance data.

2. The wireless LAN terminal according to claim 1, wherein the start instruction data transmission unit transmits data indicating a public key together with the start instruction data; wherein the start acceptance data is encrypted with the public key; and wherein the terminal side security setting unit decrypts the start acceptance data with a secret key that is paired with the public key.

3. The wireless LAN terminal according to claim 1, wherein the start instruction data transmission unit generates and transmits data indicating a different public key each time the terminal side start instruction reception unit receives a start instruction for the security setting process.

4. The wireless LAN terminal according to claim 2, wherein the start acceptance data includes data indicating a public key that is generated by the access point, and is encrypted with the public key that is transmitted together with the start instruction data.

5. The wireless LAN terminal according to claim 1, wherein the terminal side security setting unit requests data necessary for security setting to the access point via the terminal side wireless communication unit, performs security setting in accordance with a response to the request, transmits response public key data indicating a different public key that encrypts the response each time the request is made, and decrypts the response with a secret key that is paired with the response public key data.

6. The wireless LAN terminal according to claim 1, wherein the terminal side wireless communication unit is capable of establishing wireless communication on a plurality of channels; and wherein the start instruction data transmission unit, the start acceptance data reception unit, and the terminal side security setting unit use only a predetermined specific channel to communicate with the access point.

7. A security setting method for a wireless LAN terminal that uses wireless communication to perform a security setting process for wirelessly communicating with an access point, the method comprising:
 a terminal side start instruction reception step for receiving a start instruction for the security setting process;
 a start instruction data transmission step for wirelessly transmitting start instruction data, which indicates the start of the security setting process, after receipt of the start instruction;
 a start acceptance data reception step for wirelessly receiving start acceptance data, which is transmitted from the access point during a security setting process that is started in accordance with the start instruction data and indicates that the start of the security setting process is accepted; and
 a terminal side security setting step in which the security setting process is not performed if a plurality of start acceptance data are received in the start acceptance data reception step, and in which the security setting process is performed if only one start acceptance data is received in the start acceptance data reception process.

8. A computer readable medium encoded with a computer executable instructions, the instructions comprising:
 a control program for a wireless LAN terminal that uses wireless communication to perform a security setting process for wirelessly communicating with an access point, wherein the wireless LAN terminal includes a terminal side wireless communication unit for wirelessly communicating with the access point,
 the control program comprising,
  a terminal side start instruction reception function for receiving a start instruction for the security setting process;
  a start instruction data transmission function, which, after receipt of the start instruction, allows the terminal side wireless communication unit to transmit start instruction data that indicates the start of the security setting process;
  a start acceptance data reception function for receiving start acceptance data through the terminal side wireless communication unit, the start acceptance data transmitted from the access point during the security setting process initiated in accordance with the start instruction data and indicates that the start of the security setting process is accepted; and
  a terminal side security setting function, which does not perform the security setting process if a plurality of start acceptance data are received by the start acceptance data reception function, and which performs the security setting process if only one start acceptance data is received by the start acceptance data reception function.

9. A security setting system for performing a security setting process for wireless communication between an access point and a wireless LAN terminal by means of wireless communication, the system comprising:
 an access point; and
 a wireless LAN terminal;
 wherein the access point includes:
 an access point side wireless communication unit for wirelessly communicating with the wireless LAN terminal;
 an access point side start instruction reception unit for receiving a start instruction for the security setting process;
 a start instruction data reception unit for receiving start instruction data that indicates the start of the security setting process through the access point side wireless communication unit; and
 an access point side security setting unit, which does not perform the security setting process if the start instruction data is received before the start instruction is received by the access point side start instruction reception unit, and which performs the security setting process, if the start instruction data is not received before the start instruction is received by the access point side start instruction reception unit, by causing the access point side wireless communication unit to transmit start acceptance data indicating that the start of the security setting process is accepted,
 wherein the wireless LAN terminal includes:
 a terminal side wireless communication unit for wirelessly communicating with the access point;
 a terminal side start instruction reception unit for receiving a start instruction for the security setting process;
 a start instruction data transmission unit for allowing the terminal side wireless communication unit to transmit the start instruction data after receipt of the start instruction;
 a start acceptance data reception unit for receiving start acceptance data through the terminal side wireless communication unit; and
 a terminal side security setting unit, which does not perform the security setting process if a plurality of start acceptance data are received by the start acceptance data reception unit, and which performs the security setting process if only one start acceptance data is received by the start acceptance data reception unit.

* * * * *